(12) United States Patent
Nagamine

(10) Patent No.: US 11,749,823 B2
(45) Date of Patent: Sep. 5, 2023

(54) METHOD FOR MANUFACTURING FUEL CELL STACK BODY AND METHOD FOR MANUFACTURING FUEL CELL STACK

(71) Applicant: HONDA MOTOR CO., LTD., Tokyo (JP)

(72) Inventor: Shingo Nagamine, Tokyo (JP)

(73) Assignee: Honda Motor Co., Ltd., Toyko (JP)

(*) Notice: Subject to any disclaimer, the term of this patent is extended or adjusted under 35 U.S.C. 154(b) by 0 days.

(21) Appl. No.: 17/476,068

(22) Filed: Sep. 15, 2021

(65) Prior Publication Data

US 2022/0085400 A1 Mar. 17, 2022

(30) Foreign Application Priority Data

Sep. 16, 2020 (JP) ................. 2020-155257

(51) Int. Cl.
*H01M 8/1004* (2016.01)
*H01M 8/1044* (2016.01)
*H01M 8/0241* (2016.01)
*H01M 8/0267* (2016.01)

(52) U.S. Cl.
CPC ....... *H01M 8/1004* (2013.01); *H01M 8/0241* (2013.01); *H01M 8/1044* (2013.01); *H01M 8/0267* (2013.01)

(58) Field of Classification Search
CPC ............. H01M 8/1004; H01M 8/0241; H01M 8/1044; H01M 8/0267; Y02E 60/50; Y02P 70/50
See application file for complete search history.

(56) References Cited

U.S. PATENT DOCUMENTS

| 2008/0120829 | A1  | 5/2008  | Furukawa et al. |
| 2009/0047561 | A1* | 2/2009  | Yodoshi ................ H01M 8/026 429/534 |
| 2014/0120457 | A1  | 5/2014  | Choi et al. |
| 2019/0319291 | A1  | 10/2019 | Cook et al. |
| 2021/0083320 | A1* | 3/2021  | Wachsman ............ H01M 4/485 |

FOREIGN PATENT DOCUMENTS

| JP | 2005-158615 A | 6/2005 |
| JP | 2007-179792 A | 7/2007 |
| JP | 2011-154787 A | 8/2011 |
| JP | 2022-512964 A | 2/2022 |
| KR | 2015-0056253 A | 5/2015 |
| WO | 2020097119 A1 | 5/2020 |

* cited by examiner

*Primary Examiner* — Helen Oi K Conley
(74) *Attorney, Agent, or Firm* — Carrier, Shende & Associates P.C.; Joseph P. Carrier; Fulchand P. Shende

(57) ABSTRACT

A method for manufacturing a fuel cell stack body includes a step of forming a plurality of line-shaped separator cross-sectional patterns. In the patterns, a first direction along the build surface is the stacking direction, and a second direction orthogonal to the first direction is the planar direction of the separators. The patterns extend in the second direction and meander so as to have convexities and concavities in the first direction. The manufacturing method further includes a step of forming the electrolyte membrane cross-sectional pattern and a step of forming the electrode cross-sectional patterns. These steps are repeated to perform stacking in a direction perpendicular to the build surface.

5 Claims, 7 Drawing Sheets

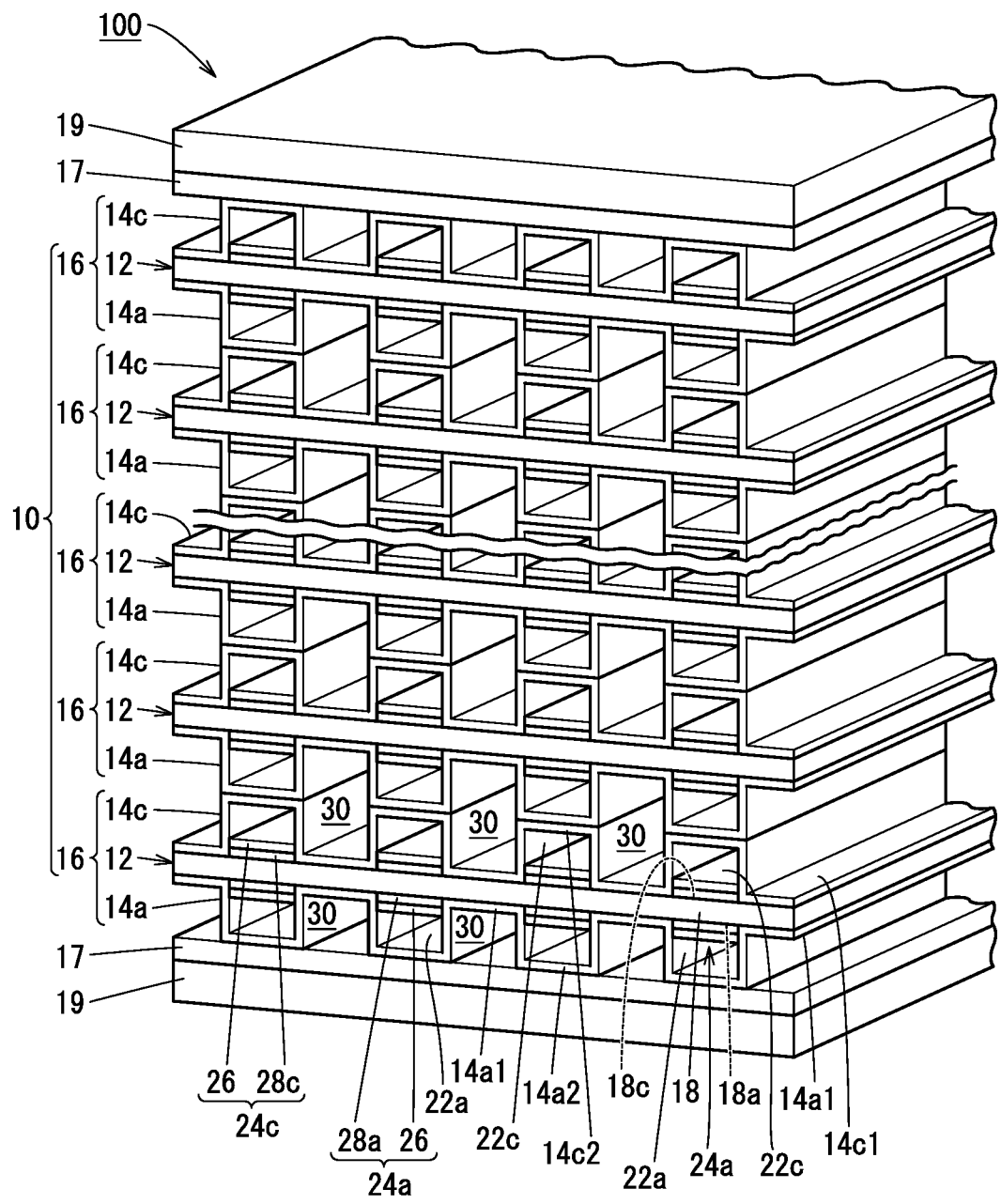
FIG. 1
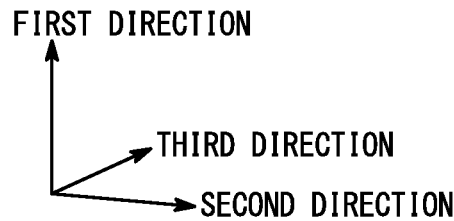

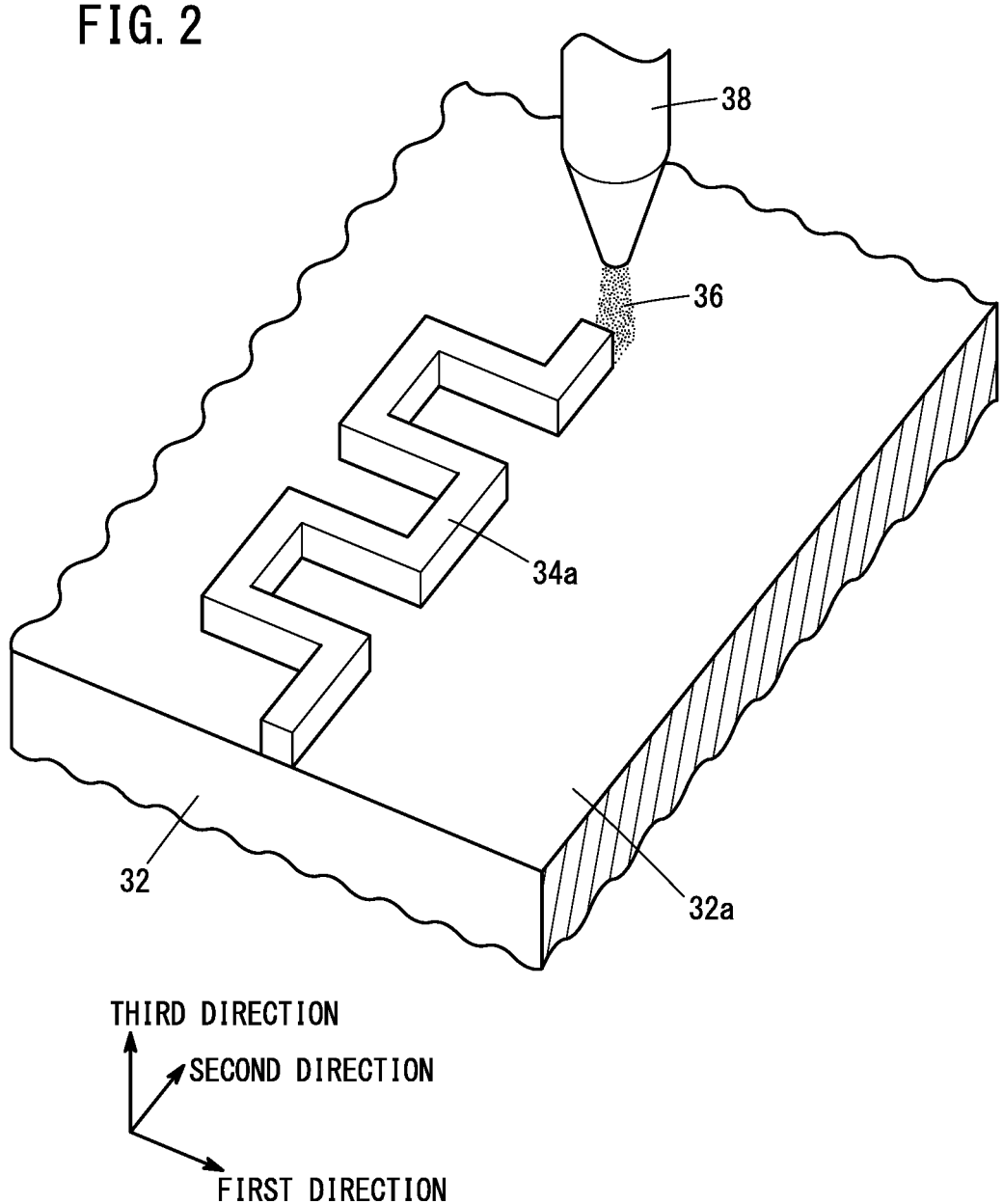

METHOD FOR MANUFACTURING FUEL CELL STACK BODY AND METHOD FOR MANUFACTURING FUEL CELL STACK

CROSS-REFERENCE TO RELATED APPLICATION

This application is based upon and claims the benefit of priority from Japanese Patent Application No. 2020-155257 filed on Sep. 16, 2020, the contents of which are incorporated herein by reference.

BACKGROUND OF THE INVENTION

Field of the Invention

The present invention relates to a method for manufacturing a fuel cell stack body including a plurality of membrane electrode assemblies stacked together with separators interposed therebetween, and also relates to a method for manufacturing a fuel cell stack.

Description of the Related Art

The fuel cell stack body has a structure in which a plurality of layers (for example, several tens to several hundreds of layers) of membrane electrode assemblies are stacked. Each membrane electrode assembly is formed by providing an anode and a cathode on respective both surfaces of a thin plate-shaped electrolyte membrane so as to sandwich the electrolyte membrane between the anode and the cathode. In the fuel cell stack body, the membrane electrode assemblies are stacked with conductive separators interposed therebetween.

Such a fuel cell stack body is manufactured by a method disclosed in, for example, JP 2005-158615 A. First, a desired number of membrane electrode assemblies and a desired number of separators are manufactured. Thereafter, the membrane electrode assemblies and the separators are assembled so as to be stacked. In the stacked fuel cell stack body, a fuel gas flow field and an oxygen-containing gas flow field are formed on respective both sides of each membrane electrode assembly. The fuel gas flow field and the oxygen-containing gas flow field are required to have high airtightness.

In order to ensure sufficient airtightness, the membrane electrode assembly and the separator are required to have high accuracy. Therefore, a dedicated facility is used for stacking the membrane electrode assembly and the separator. The assembly of the membrane electrode assembly and the separator is performed while carefully positioning them using a guide jig. The membrane electrode assembly and the separator also require a liquid seal or a rubber seal to ensure airtightness.

However, a conventional method for manufacturing a fuel cell stack body requires a large number of steps for securing airtightness, resulting in high production cost.

SUMMARY OF THE INVENTION

It is an object of the present invention to provide a manufacturing method of a fuel cell stack body and a manufacturing method of a fuel cell stack, which are capable of manufacturing the fuel cell stack body capable of reducing production cost.

According to an aspect of the present disclosure, there is provided a method for manufacturing a fuel cell stack body including a membrane electrode assembly and separators stacked together, the membrane electrode assembly including an electrolyte membrane and electrodes on both surfaces of the electrolyte membrane, the method including: forming a stack body cross-sectional pattern along a build surface, the stack body cross-sectional pattern including: a plurality of line-shaped separator cross-sectional patterns made of a conductive material; a line-shaped electrolyte membrane cross-sectional pattern made of an ion conductive material; and electrode cross-sectional patterns each including a diffusion layer cross-sectional pattern and a catalyst layer cross-sectional pattern; and repeating the forming of the stack body cross-sectional pattern in a manner that the stack body cross-sectional pattern is stacked one on top of another in a direction perpendicular to the build surface.

Another aspect of the present invention, there is provided a method of manufacturing a fuel cell stack, including the method for manufacturing the fuel cell stack body according to the above aspect, the method including forming a fuel cell stack by overlapping and stacking the plurality of fuel cell stack bodies.

According to the method for manufacturing the fuel cell stack body and the method for manufacturing the fuel cell stack of the above aspects, a fuel cell stack body having excellent airtightness can be manufactured at one time, and therefore manufacturing costs can be reduced.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a cutaway perspective view of a fuel cell stack body and a fuel cell stack according to a first embodiment;

FIG. 2 is a perspective view showing a step of shaping a separator cross-sectional pattern according to the first embodiment;

DESCRIPTION OF THE PREFERRED EMBODIMENTS

Figure 3A:
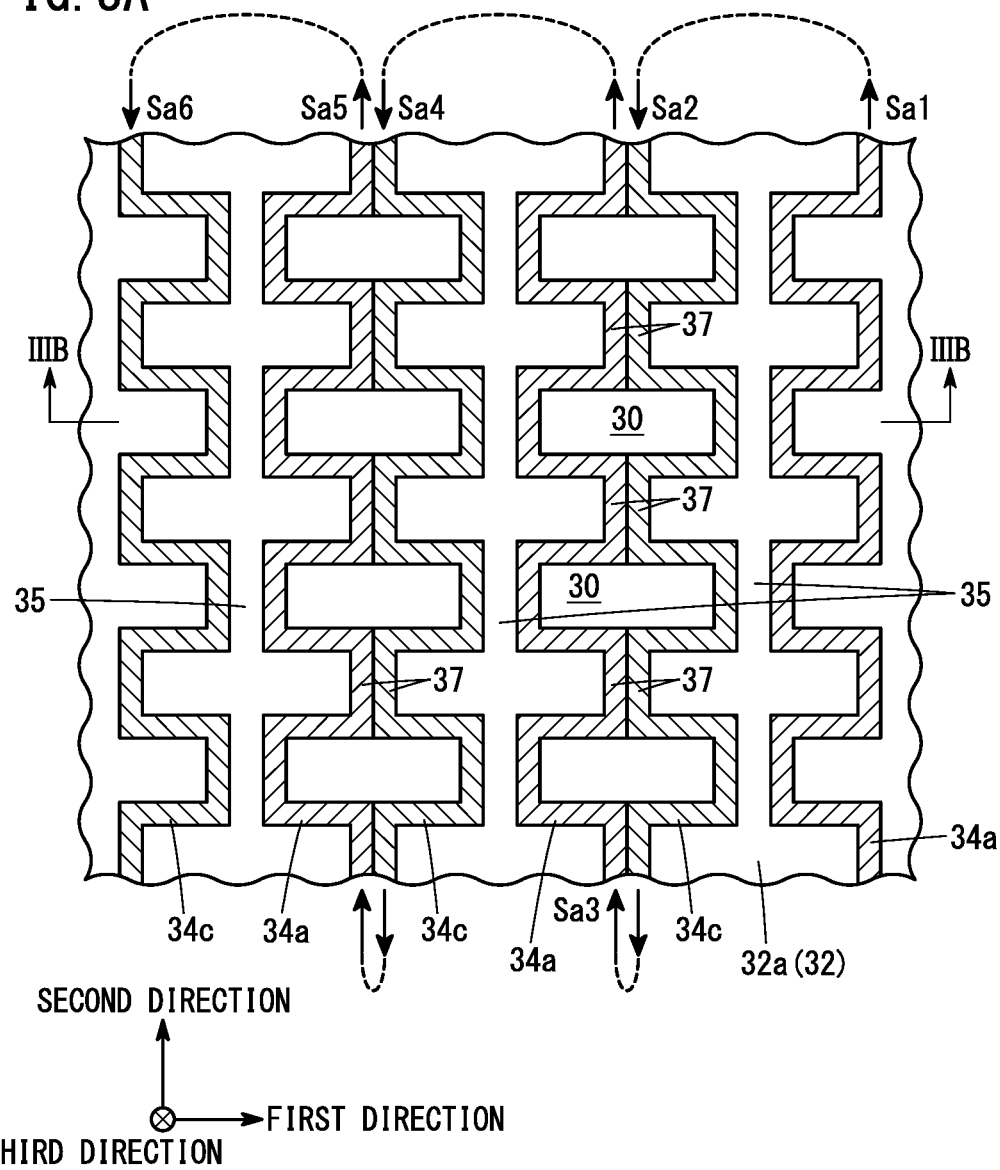
FIG. 3A is a plan view showing a state immediately after the separator cross-sectional pattern is formed.

Hereinafter, a fuel cell stack body 10 according to the present embodiment will be described in detail with reference to the accompanying drawings together with a manufacturing method thereof. In the present specification, the stacking direction of the fuel cell stack body 10 is referred to as a first direction. Of directions perpendicular to the first direction, the extending direction of a fuel gas flow field 22a, an oxygen-containing gas flow field 22c, and a coolant flow field 30 is referred to as a third direction. A direction perpendicular to the first direction and the third direction is referred to as a second direction. Note that a build surface 32a on which additive manufacturing of the fuel cell stack body 10 is performed is parallel to the first direction and the second direction. The fuel cell stack body 10 is manufactured by stacking the shaped objects on the build surface 32a in the third direction.

First Embodiment

As shown in FIG. 1, the fuel cell stack body 10 and a fuel cell stack 100 according to the present embodiment have a unit structure 16 in which a membrane electrode assembly 12 is sandwiched between a first separator 14a and a second separator 14c from the first direction which is the stacking direction. The fuel cell stack body 10 is formed by stacking several tens to several hundreds of the unit structures 16 in the first direction. One or more fuel cell stack bodies 10 are stacked in the first direction to form the fuel cell stack 100.

The fuel cell stack 100 includes a terminal plate 17 and an end plate 19 at each of opposite ends of one or a plurality of fuel cell stack bodies 10 in the first direction. An insulator (not shown) is disposed between the end plate 19 and the terminal plate 17 to prevent the end plate 19 from being electric-charged. The terminal plate 17 is disposed between the end plate 19 and the fuel cell stack body 10. One terminal plate 17 is in contact with the first separator 14a at one end of the fuel cell stack body 10 and is electrically connected to the first separator 14a. The other terminal plate 17 is electrically connected to the second separator 14c at the other end of the fuel cell stack body 10. Electric energy generated by the fuel cell stack body 10 is extracted via the terminal plate 17. A pair of end plates 19 are provided at both ends in the first direction. The pair of end plates 19 are fastened to each other by fastening bolts (not shown) to apply a predetermined tightening load to the fuel cell stack body 10.

Hereinafter, the fuel cell stack body 10 will be further described. Each of the membrane electrode assembly 12 and the separators 14a and 14c constituting the unit structure 16 of the fuel cell stack body 10 is formed in a thin plate shape. The membrane electrode assembly 12 includes an electrolyte membrane 18 formed in a flat plate shape parallel to the second direction and the third direction. The electrolyte membrane 18 is, for example, a hydrogen ion conductor that transmits hydrogen contained in the fuel gas, as hydrogen ions. The fuel cell stack body 10 is also applicable to a solid oxide fuel cell (SOFC). When the fuel cell stack body 10 is an SOFC, the electrolyte membrane 18 is an oxygen ion conductor that transmits oxygen contained in the oxygen-containing gas, as oxygen ions.

The first separator 14a is in contact with an anode surface 18a, which is one surface of the electrolyte membrane 18. The second separator 14c is in contact with a cathode surface 18c, which is the other surface of the electrolyte membrane 18. Each of the first separator 14a and the second separator 14c is formed in a rectangular or trapezoidal corrugated plate shape having irregularities in the first direction. On each of the first separator 14a and the second separator 14c, concavities and convexities (irregularities) appear at a constant pitch in the second direction. The concavities and convexities linearly extend in the third direction and each have the same shape in the third direction. The first separator 14a and the second separator 14c may extend in a wave shape in the third direction while meandering. In the first separator 14a, a first abutting portion 14a1 protruding toward the electrolyte membrane 18 is in contact with the anode surface 18a of the electrolyte membrane 18. A plurality of first abutting portions 14a1 of the first separator 14a are arranged at a constant pitch in the second direction. A separation portion 14a2 is formed between the first abutting portions 14a1 adjacent to each other. The separation portion 14a2 is a portion of the first separator 14a that is separated from the electrolyte membrane 18.

The fuel gas flow field 22a through which the fuel gas flows is formed between the separation portion 14a2 and the electrolyte membrane 18. The fuel gas flow field 22a extends in the third direction. The fuel gas flow field 22a communicates with fuel gas supply/discharge portions (not shown) provided at both ends in the third direction.

An anode 24a is formed on a portion of the anode surface 18a of the electrolyte membrane 18 that faces the fuel gas flow field 22a. The anode 24a includes an anode catalyst layer 28a and a diffusion layer 26. The anode catalyst layer 28a is formed on the anode surface 18a of the electrolyte membrane 18 and contains an anode catalyst. The diffusion layer 26 is formed on the anode catalyst layer 28a.

The second separator 14c is formed in a rectangular or trapezoidal corrugated plate shape having irregularities in the first direction. The protruding height of the irregularities of the second separator 14c has the same dimension as the protruding height of the irregularities of the first separator 14a. The pitch of the irregularities of the second separator 14c in the second direction has the same as the pitch of the irregularities of the first separator 14a in the second direction. The second separator 14c is in contact with the cathode surface 18c of the electrolyte membrane 18 at a second abutting portion 14c1 protruding toward the electrolyte membrane 18. A separation portion 14c2 is formed between the second abutting portions 14c1 adjacent to each other. The separation portion 14c2 is a portion of the second separator 14c that is separated from the electrolyte membrane 18. The oxygen-containing gas flow field 22c is formed between the separation portion 14c2 and the electrolyte membrane 18.

A cathode 24c is formed on a portion of the cathode surface 18c of the electrolyte membrane 18 that faces the oxygen-containing gas flow field 22c. The oxygen-containing gas flow field 22c extends in the third direction in a linear or wavy shape. The cathode 24c includes a cathode catalyst layer 28c and a diffusion layer 26. The cathode catalyst layer 28c includes a cathode catalyst formed on the cathode surface 18c of the electrolyte membrane 18. The diffusion layer 26 is stacked on the cathode catalyst layer 28c.

In the fuel cell stack body 10, the unit structures 16 are stacked such that the first separator 14a of one unit structure 16 and the second separator 14c of the other unit structure 16 adjacent thereto are in mechanical and electrical contact with each other. In this case, the separation portion 14a2 of the first separator 14a and the separation portion 14c2 of the second separator 14c are in contact with each other. The coolant flow field 30 is formed between the first abutting portion 14*a*1 of the first separator 14*a* and the second abutting portion 14*c*1 of the second separator 14*c* adjacent thereto. The coolant flow field 30 extends in the third direction. Both ends of the coolant flow field 30 in the third direction communicate with a coolant supply/discharge portion (not shown).

Hereinafter, a method of manufacturing the fuel cell stack body 10 of the present embodiment will be described.

Figure 4A:
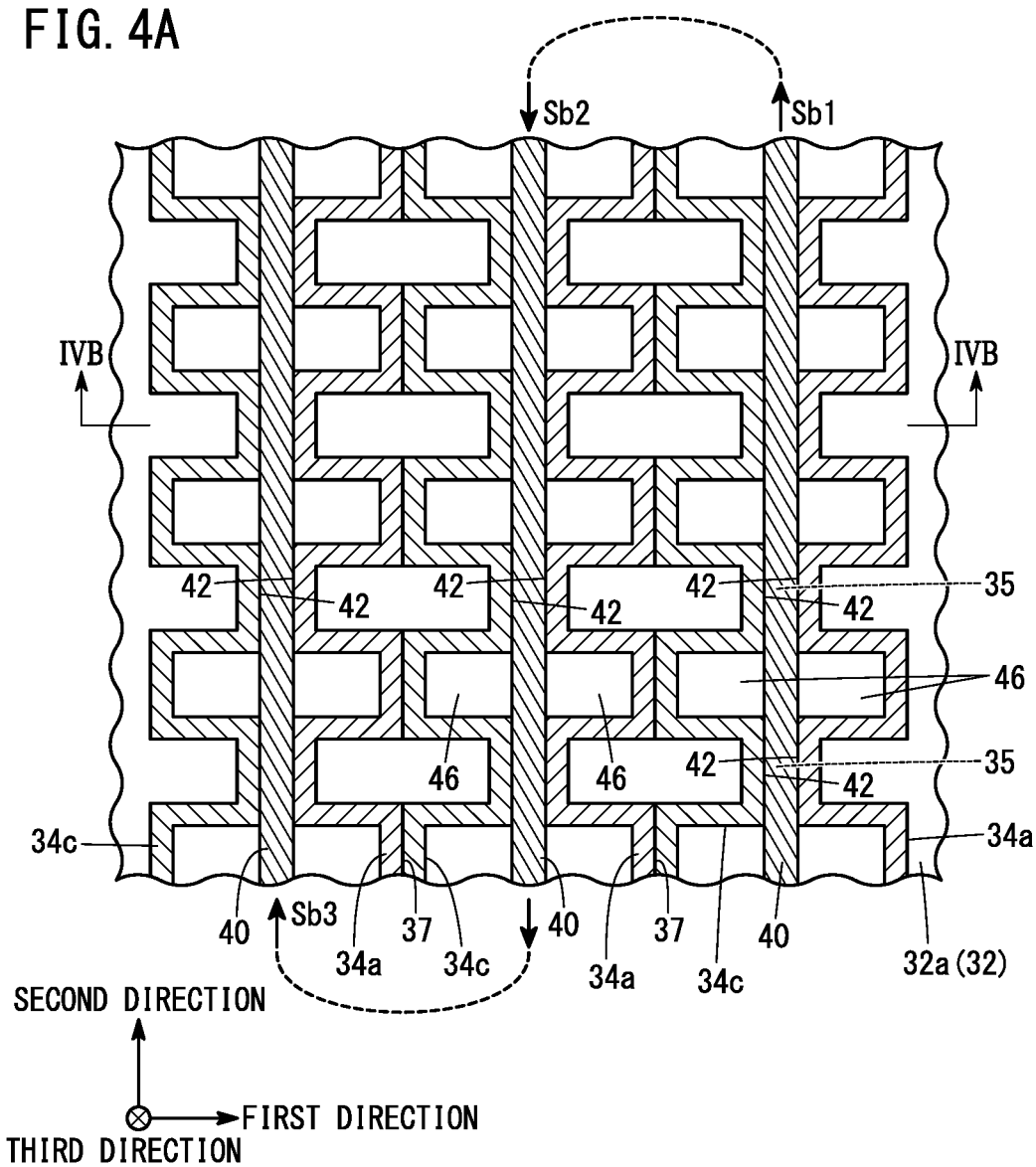
FIG. 4A is a plan view showing a state immediately after the electrolyte membrane cross-sectional pattern is formed.

The method for manufacturing the fuel cell stack body 10 of the present embodiment is performed by an additive manufacturing method. That is, in the additive manufacturing method, a process of forming a stack body cross-sectional pattern 31 of FIG. 5A along the plane (i.e., the first direction and the second direction) of FIG. 4A is performed. This process is repeatedly performed a plurality of times so as to stack the patterns in the third direction (i.e., a direction perpendicular to the paper surface of the drawing) to form a three dimensional shape. Note that the stacking direction when additive-manufacturing of the fuel cell stack body 10 is performed is the third direction. The stacking direction (third direction) during the additive manufacturing process is different from the stacking direction (first direction) of the unit structures 16 each including the membrane electrode assembly 12, the first separator 14*a*, and the second separator 14*c*, of the fuel cell stack body 10.

First, the shaping step (modeling step) of the first layer will be described. As shown in FIG. 2, a shaping table (build platform) 32 is prepared. The shaping table 32 has a flat build surface 32*a*. The build surface 32*a* may be covered with a material that enables a shaped object to be easily peeled off, such as a fluororesin, in order to facilitate removal of the fuel cell stack body 10, which is the shaped object.

Next, as shown in FIG. 2, a separator cross-sectional pattern 34*a* is formed on the flat build surface 32*a* of the shaping table 32. The separator cross-sectional pattern 34*a* constitutes a part of the first separator 14*a*. The separator cross-sectional pattern 34*a* is formed by an inkjet method. In the inkjet method, a heated conductive ink 36 containing a metal powder and a binder containing a thermoplastic resin that fluidizes the metal powder is sprayed from an inkjet nozzle 38 onto the build surface 32*a* to form a separator cross-sectional pattern 34*a*. The binder is not limited to a thermoplastic resin, and may be a thermosetting resin, an ultraviolet (radiation) curable resin, or the like. When the thermoplastic resin is not used as the binder, the conductive ink 36 may not be heated.

As the material of the metal powder, metals having corrosion resistance such as stainless steel (for example, SUS316 and SUS304), titanium, niobium, aluminum, and alloys thereof can be used. Instead of the metal powder, a conductive material (such as carbon or silicon) can be used. The term "corrosion resistance" as used herein means resistance to corrosion by a fuel gas (for example, hydrogen or hydrocarbon), an oxygen-containing gas (for example, oxygen or air), and a substance generated by an electrode reaction (for example, water, carbon monoxide, or carbon dioxide).

As shown in FIG. 3A, in the formation of the separator cross-sectional pattern 34*a*, the inkjet nozzle 38 (see FIG. 2) moves in the second direction while meandering so as to have rectangular convexities and concavities in the first direction (scanning Sa1). The inkjet nozzle 38 forms one separator cross-sectional pattern 34*a* by one movement from one end to the other end of the fabrication region. A plurality of the inkjet nozzles 38 may be provided in one inkjet head.

In this case, the inkjet head forms a plurality of separator cross-sectional patterns 34*a* by one movement.

Thereafter, the inkjet nozzle 38 is moved to perform the second scanning Sa2 (backward path) in the same manner, thereby forming the second separator cross-sectional pattern 34*c*. The separator cross-sectional pattern 34*c* constitutes a part of the second separator 14*c*. In FIG. 3A, a broken line from an arrow with a reference symbol Sa1 to an arrow with a reference symbol Sa2 indicates a movement path of the inkjet nozzle 38 from the first scanning to the second scanning. The inkjet nozzle 38 is moved a given distance from the first scanning Sa1 to the second scanning Sa2 in the first direction. Thereafter, the inkjet nozzle 38 forms the separator cross-sectional pattern 34*c* by the second scanning Sa2. In the second scanning Sa2, the inkjet nozzle 38 is moved in a direction opposite to the first scanning Sa1.

Thereafter, as shown in the drawing, second-direction scannings Sa3 to Sa6 are sequentially repeated to form a desired number of separator cross-sectional patterns 34*a* and 34*c*. The separator cross-sectional pattern 34*a* formed by the scanning Sa1 and the separator cross-sectional pattern 34*c* formed by the scanning Sa2 are separated from each other in the first direction. A gap 35 is formed between the separator cross-sectional patterns 34*a* and 34*c*. The width (separation distance in the first direction) of the gap 35 is equal to the thickness of the electrolyte membrane 18.

In addition, the top portions of the separator cross-sectional pattern 34*a* formed by the scanning Sa3 and the top portions of the separator cross-sectional pattern 34*c* formed by the scanning Sa2 are formed so as to be in contact with each other in the first direction. The top portions of the separator cross-sectional pattern 34*a* and the top portions of the separator cross-sectional pattern 34*c* are in contact with each other at contact portions 37 and are electrically connected to each other. A plurality of contact portions 37 between the top portions of the separator cross-sectional pattern 34*a* and the top portions of the separator cross-sectional pattern 34*c* are provided at a constant pitch in the second direction. A portion sandwiched between two contact portions 37 adjacent to each other in the second direction constitutes a part of the coolant flow field 30.

Similarly, the separator cross-sectional patterns 34*a* and 34*c* separated by the gap 35 and the separator cross-sectional patterns 34*a* and 34*c* in contact with each other via the contact portions 37 are alternately formed in the first direction on the build surface 32*a* of the shaping table 32.

Figure 3B:
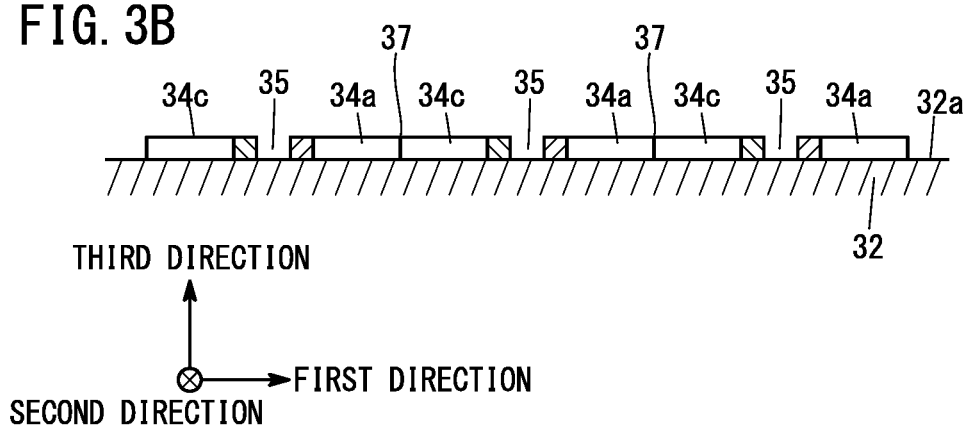
FIG. 3B is a cross-sectional view taken along line IIIB-IIIB of FIG. 3A.

As shown in FIG. 3B, the plurality of separator cross-sectional patterns 34*a* and 34*c* are formed to have a uniform thickness in the third direction. The upper ends of the separator cross-sectional patterns 34*a* and 34*c* are substantially flat.

Next, as shown in FIG. 4A, an electrolyte membrane cross-sectional pattern 40 is formed on the build surface 32*a* of the shaping table 32. The electrolyte membrane cross-sectional pattern 40 is formed by an inkjet method. In the inkjet method, an electrolyte membrane ink in which a porous non-conductive binder and an ion exchange material are dispersed in a solvent is jetted from an inkjet nozzle 38 to the build surface 32*a*. The electrolyte membrane cross-sectional pattern 40 is formed by scanning the inkjet nozzle 38 in the second direction (forward path) so as to pass through the gaps 35 between the separator cross-sectional patterns 34*a* and 34*c*. The electrolyte membrane cross-sectional pattern 40 has the same width as the width (dimension in the first direction) of the gap 35. The electrolyte membrane cross-sectional pattern 40 is formed as a pattern linearly extending in the second direction.

In the step of forming the electrolyte membrane cross-sectional pattern 40, the inkjet nozzle 38 forms the first electrolyte membrane cross-sectional pattern 40 by one movement (scanning Sb1) in the second direction. Thereafter, a second electrolyte membrane cross-sectional pattern 40 is formed. In particular, after the end of the scanning Sb1, the inkjet nozzle 38 is moved in the first direction. Thereafter, scanning Sb2 of the inkjet nozzle 38 in the second direction is performed. Thus, the second electrolyte membrane cross-sectional pattern 40 is formed. The above operation is repeated until a desired number of electrolyte membrane cross-sectional patterns 40 are formed.

Figure 4B:
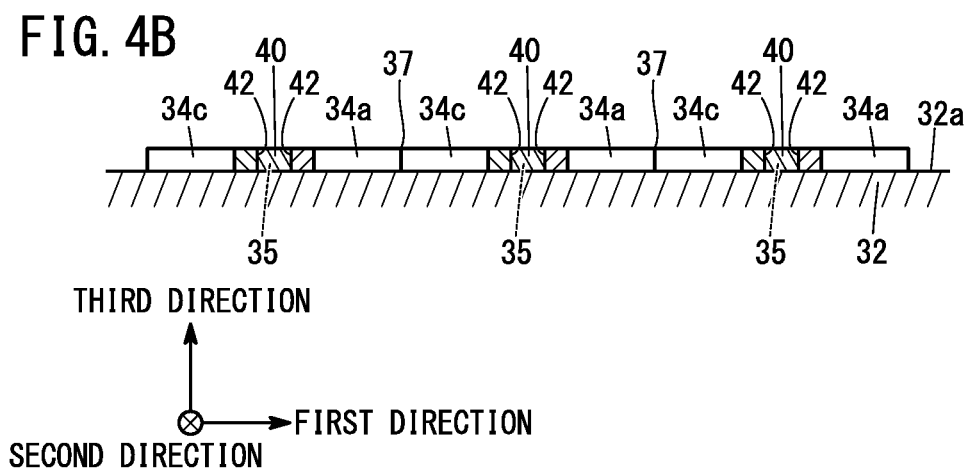
FIG. 4B is a cross-sectional view taken along line IVB-IVB of FIG. 4A.

As shown in FIG. 4B, the electrolyte membrane cross-sectional pattern 40 formed in the step of FIG. 4A is formed to have the same width (dimension in the first direction) as the gap 35 between the separator cross-sectional patterns 34*a* and 34*c*. The electrolyte membrane cross-sectional pattern 40 is formed to have the same thickness (dimension in the third direction) as the separator cross-sectional patterns 34*a* and 34*c*.

In the gap 35, the side portions of the electrolyte membrane cross-sectional pattern 40, and the separator cross-sectional patterns 34*a* and 34*c* are in close contact with each other. A portion where the side portion of the electrolyte membrane cross-sectional pattern 40 and the separator cross-sectional pattern 34*a*, 34*c* are in close contact with each other is an abutting portion 42. The abutting portion 42 where the separator cross-sectional pattern 34*a*, 34*c* abuts against the electrolyte membrane cross-sectional pattern 40 corresponds to the first abutting portion 14*a*1 or the second abutting portion 14*c*1 in FIG. 1. Separation portions 46 are formed on side portions of the electrolyte membrane cross-sectional pattern 40 other than the abutting portions 42. The separation portion 46 constitutes a part of the fuel gas flow field 22*a* or the oxygen-containing gas flow field 22*c*. When the electrolyte membrane cross-sectional pattern 40 is formed by the inkjet method, the gap 35 is densely filled with uncured (not-yet-hardened) electrolyte membrane ink. Therefore, the abutting portion 42 has high airtightness.

Figure 5A:
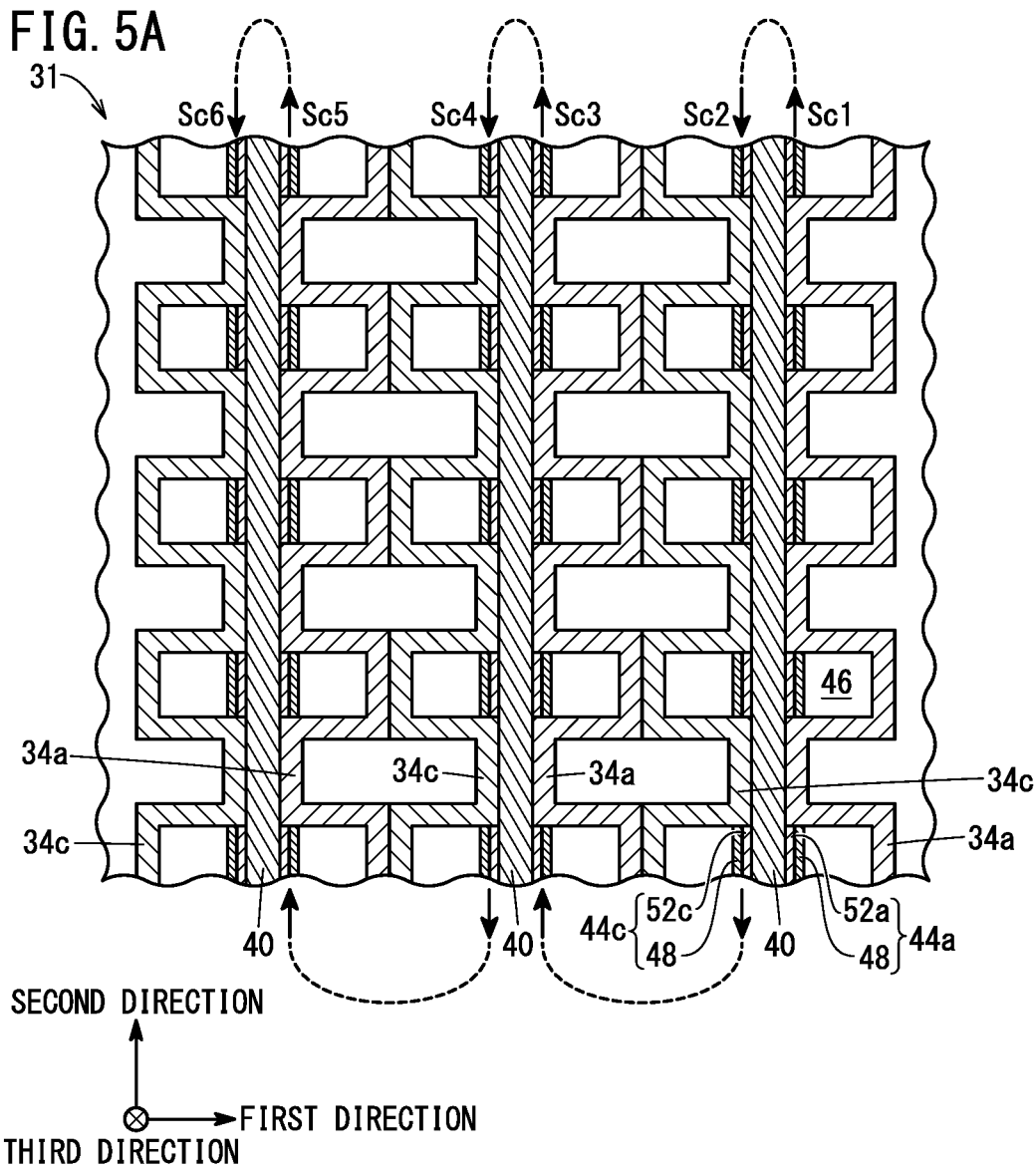
FIG. 5A is a plan view showing a state immediately after an electrode cross-sectional pattern is formed on a side portion of the electrolyte membrane cross-sectional pattern of FIG. 4A.
Figure 5B:
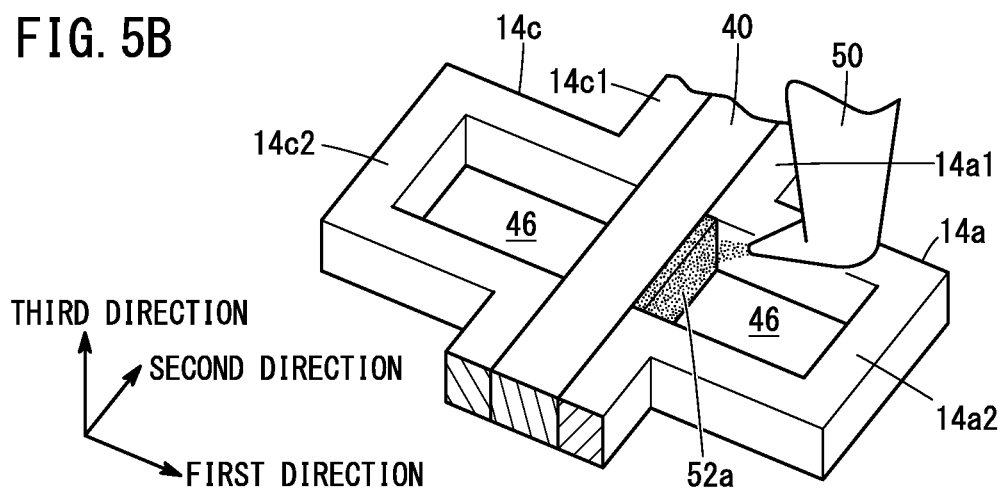
FIG. 5B is an enlarged perspective view showing a method of forming the electrode cross-sectional pattern of FIG. 5A.

Next, as shown in FIG. 5A, electrode cross-sectional patterns 44*a* and 44*c* are formed on the side surfaces of the electrolyte membrane cross-sectional pattern 40. As shown in FIG. 5B, the electrode cross-sectional pattern 44*a* is formed by spraying an electrode material from a nozzle 50 onto the side surface of the electrolyte membrane cross-sectional pattern 40 exposed in the separation portion 46. In this embodiment, first, an ink containing an anode catalyst containing, for example, platinum (Pt) or a platinum alloy is applied to a side surface of the electrolyte membrane cross-sectional pattern 40 that faces the separator cross-sectional pattern 34*a*, using the nozzle 50 shown in FIG. 5B. The solvent contained in the ink is volatilized and removed, whereby a catalyst layer cross-sectional pattern 52*a* of the anode is formed. In order to avoid a situation in which flowing of the ink due to gravity causes the non-uniform thickness of the catalyst layer cross-sectional pattern 52*a*, this step is preferably performed in a state in which the third direction is inclined with respect to the gravity direction. As this ink, for example, an anode catalyst ink containing catalyst particles in which platinum particles are supported on carbon black can be used. The anode catalyst ink further includes a polymer electrolyte as an ion conductive binder. The anode catalyst ink is obtained by uniformly mixing catalyst particles together with a solvent in a solution of the above polymer electrolyte. The catalyst layer cross-sectional pattern 52*a* of the anode is formed only on the side surface of the electrolyte membrane cross-sectional pattern 40 that faces the separator cross-sectional pattern 34*a*. The nozzle 50 is moved as in the scanning Sc1 to the scanning Sc6 of FIG. 5A, and the scanning Sc1 to the scanning Sc6 are performed on side surfaces of all the electrolyte membrane cross-sectional patterns 40 that are exposed in the separation portion 46. Thus, the catalyst layer cross-sectional pattern 52*a* is formed. The catalyst layer cross-sectional pattern 52*a* constitutes a part (one layer) of the anode catalyst layer 28*a*.

Next, ink containing, for example, carbon powder and a water-repellent material such as fluororesin is applied to the side surface of the anode catalyst layer cross-sectional pattern 52*a* of the electrolyte membrane cross-sectional pattern 40. The solvent contained in the ink is volatilized and removed to form a porous diffusion layer cross-sectional pattern 48 having gas diffusion characteristics. In order to prevent variations in the thickness of the diffusion layer cross-sectional pattern 48, this step is also preferably performed in a state in which the third direction is inclined with respect to the direction of gravity. Depending on the design of the fuel cell, it is not necessary to provide the diffusion layer cross-sectional pattern 48, and the electrode cross-sectional pattern 44*a* may be constituted only by the catalyst layer cross-sectional pattern 52*a*. In this case, the step of forming the diffusion layer cross-sectional pattern 48 can be omitted. For example, in the case of a fuel cell such as an SOFC, a reforming catalyst layer or the like may be formed instead of the diffusion layer cross-sectional pattern 48. The diffusion layer cross-sectional patterns 48 are formed by moving the nozzle 50 as in the scanning Sc1 to the scanning Sc6 of FIG. 5A. The diffusion layer cross-sectional pattern 48 constitutes a part of the diffusion layer 26. Thus, one layer of the electrode cross-sectional pattern 44*a* of the anode is completed.

Next, ink containing a cathode catalyst (for example, platinum (Pt) or the like) is applied to the side surface for the cathode (i.e., a portion facing the separator cross-sectional pattern 34*c*) of the electrolyte membrane cross-sectional pattern 40, using the nozzle 50 shown in FIG. 5B. The solvent of the ink is volatilized, whereby a catalyst layer cross-sectional pattern 52*c* of the cathode is formed. The nozzle 50 is scanned so as to reciprocate in the second direction, to thereby form the catalyst layer cross-sectional pattern on all the side surfaces facing the cathode of the electrolyte membrane cross-sectional pattern 40 and that are exposed in the separation portion 46. Thus, the catalyst layer cross-sectional pattern 52*c* is formed. The application of the ink is preferably performed in a state in which the third direction is inclined with respect to the gravity direction. The catalyst layer cross-sectional pattern 52*c* on the cathode side thus formed constitutes a part of the cathode catalyst layer 28*c*. The cathode-side ink contains, for example, catalyst particles in which platinum particles are supported on carbon black. The ink on the cathode side further contains a polymer electrolyte as an ion conductive binder. The ink for the cathode catalyst is prepared by uniformly mixing catalyst particles in a solution of the polymer electrolyte. In this step, the nozzle 50 reciprocates in the second direction as indicated by the scanning Sc1 to the scanning Sc6 in FIG. 5A.

Thereafter, the diffusion layer cross-sectional pattern 48 is formed on the side surface of the catalyst layer cross-sectional pattern 52*c*. The diffusion layer cross-sectional pattern 48 on the cathode side is formed in the same manner as the diffusion layer cross-sectional pattern 48 on the anode side. Thus, the electrode cross-sectional pattern 44*c* on the cathode side is completed. Incidentally, after the formation of the anode-side catalyst layer cross-sectional pattern 52*a* and the cathode-side catalyst layer cross-sectional pattern 52c is completed, the anode-side diffusion layer cross-sectional pattern 48 and the cathode-side diffusion layer cross-sectional pattern 48 may be formed together.

Through the above-described steps, the fabrication of the stack body cross-sectional pattern 31 of the first layer shown in FIG. 5A is completed.

Next, the separator cross-sectional patterns 34a and 34c, the electrolyte membrane cross-sectional pattern 40, and the electrode cross-sectional patterns 44a and 44c constituting the second layer of the stack body cross-sectional patterns 31 are fabricated. The separator cross-sectional patterns 34a and 34c of the second layer are formed on the separator cross-sectional patterns 34a and 34c of the first layer, into the same shape, using the same material by the inkjet method. In addition, the electrolyte membrane cross-sectional pattern 40 of the second layer is formed on the electrolyte membrane cross-sectional pattern 40 of the first layer, into the same shape, using the same material by the inkjet method. The electrode cross-sectional patterns 44a and 44c of the second layer are formed on the electrode cross-sectional patterns 44a and 44c of the first layer into the same shape and stacked.

Figure 6:
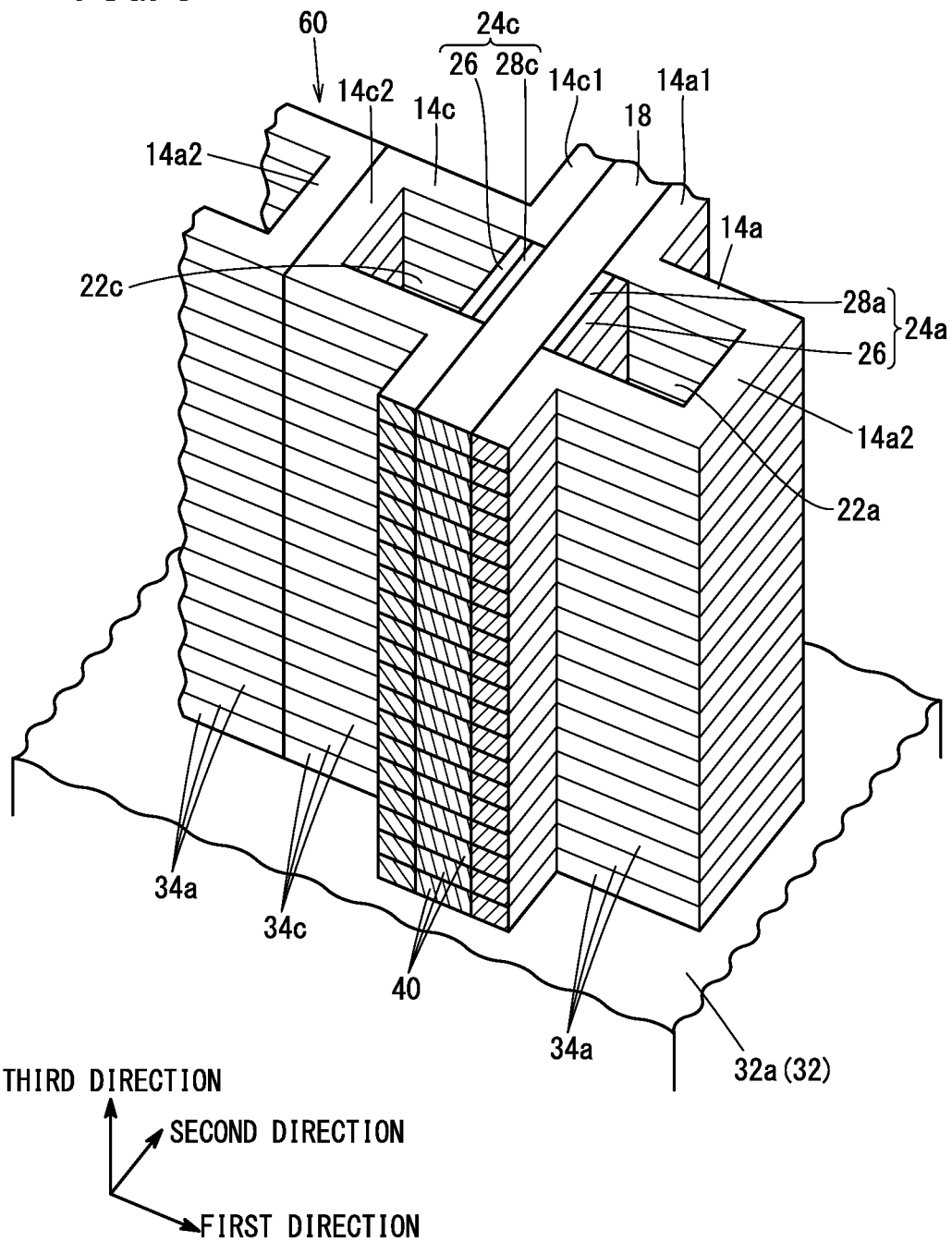
FIG. 6 is a partially enlarged perspective view of a fuel cell stack body formed by stacking a separator cross-sectional pattern, an electrolyte membrane cross-sectional pattern, and an electrode cross-sectional pattern in a third direction by repeating the steps shown in FIG. 2 to FIG. 5B.

Further, the structure 60 having the cross-sectional shape shown in FIG. 6 is formed by repeating the formation of the stack body cross-sectional pattern 31 (the separator cross-sectional patterns 34a and 34c, the electrolyte membrane cross-sectional pattern 40, and the electrode cross-sectional patterns 44a and 44c) a plurality of times.

Thereafter, in order to cure (harden) the structure 60 and stabilize the shape and strength of the structure 60, the structure 60 is subjected to heat treatment for a certain period of time. With the above process, the fuel cell stack body 10 is completed.

Next, a plurality of fuel cell stack bodies 10 are prepared, and these fuel cell stack bodies 10 are overlapped and stacked in the first direction. Next, the terminal plate 17 and the end plate 19 are arranged at each of the both ends in the first direction, and are fastened in the first direction by a tightening bolt or the like. Thus, the fuel cell stack 100 is completed. In the fuel cell stack 100, the fuel cell stack body 10 may be used alone. In this case, the step of stacking the fuel cell stack bodies 10 may be omitted.

Hereinafter, operations of the fuel cell stack body 10 and the fuel cell stack 100 will be described.

First, as shown in FIG. 1, an oxygen-containing gas (e.g., air) is supplied to the oxygen-containing gas flow field 22c through the oxygen-containing gas supply/discharge unit. A fuel gas such as a hydrogen-containing gas is supplied to the fuel gas flow field 22a through the fuel gas supply/discharge unit. Further, a coolant such as pure water, ethylene glycol, or oil is supplied to the coolant flow field 30 through the coolant supply/discharge unit.

The oxygen-containing gas flows in the third direction along the oxygen-containing gas flow field 22c and is supplied to the cathode 24c of the membrane electrode assembly 12. On the other hand, the fuel gas is introduced into the fuel gas flow field 22a of the first separator 14a from the fuel gas supply unit. The fuel gas flows in the third direction along the fuel gas flow field 22a and is supplied to the anode 24a of the membrane electrode assembly 12.

Therefore, in each membrane electrode assembly 12, the oxygen-containing gas supplied to the cathode 24c and the fuel gas supplied to the anode 24a are consumed by electrochemical reactions in the catalyst layers 28a and 28c. Thus, power is generated.

The oxygen-containing gas supplied to and consumed at the cathode 24c is discharged from the oxygen-containing gas supply/discharge unit. Similarly, the fuel gas supplied to and consumed at the anode 24a is discharged from the fuel gas supply/discharge unit.

The coolant supplied to the coolant supply/discharge unit is introduced into the coolant flow field 30 between the first separator 14a and the second separator 14c. The coolant flows through the coolant flow field 30 in the third direction to cool the membrane electrode assembly 12. After cooling the membrane electrode assembly 12, the coolant is discharged from the coolant supply/discharge unit.

The method for manufacturing the fuel cell stack body 10 and the method for manufacturing the fuel cell stack 100 according to the present embodiment have the following effects.

A method for manufacturing a fuel cell body stack body 10 of the present embodiment is a method for manufacturing a fuel cell stack body 10 including a membrane electrode assembly 12 and separators 14a, 14c stacked together, the membrane electrode assembly including an electrolyte membrane 18 and electrodes (an anode 24a and a cathode 24c) on both surfaces (an anode surface 18a and a cathode surface 18c) of the electrolyte membrane 18, the method including: forming a stack body cross-sectional pattern 31 along a build surface 32a, the stack body cross-sectional pattern including: a plurality of line-shaped separator cross-sectional patterns 34a, 34c made of a conductive material; a line-shaped electrolyte membrane cross-sectional pattern 40 made of an ion conductive material; and electrode cross-sectional patterns 44a, 44c each including a diffusion layer cross-sectional pattern 48 and a catalyst layer cross-sectional pattern 52a, 52c; and repeating the forming of the stack body cross-sectional pattern 31 in a manner that the stack body cross-sectional pattern 31 is stacked one on top of another in a direction perpendicular to the build surface 32a.

According to the above-described manufacturing method, the fuel cell stack body 10 including the separators 14a and 14c and the membrane electrode assembly 12 can be simultaneously and integrally formed, and therefore the manufacturing cost can be reduced.

In the above method for manufacturing the fuel cell stack body 10, a first direction along the build surface 32a is a stacking direction of the membrane electrode assembly 12 and the separators 14a, 14c, and a second direction extends along the build surface 32a and is orthogonal to the first direction, the second direction extending along a planar direction of the separators 14a, 14c, and the forming of the stack body cross-sectional pattern 31 may include: forming the plurality of line-shaped separator cross-sectional patterns 34a, 34c extending in the second direction and meandering so as to have convexities and concavities in the first direction; forming the line-shaped electrolyte membrane cross-sectional pattern 40 extending in the second direction, between the plurality of separator cross-sectional patterns 34a, 34c; and forming the electrode cross-sectional patterns 44a, 44c each including the diffusion layer cross-sectional pattern 48 and the catalyst layer cross-sectional pattern 52a, 52c on respective both sides, in the first direction, of the electrolyte membrane cross-sectional pattern 40.

In the above method for manufacturing the fuel cell stack body 10, the forming of the electrode cross-sectional patterns 44a, 44c includes: forming the catalyst layer cross-sectional pattern 52a, 52c on a side portion of the electrolyte membrane cross-sectional pattern 40 that is separated from the separator cross-sectional pattern 34a, 34c; and forming the diffusion layer cross-sectional pattern 48 on a side portion of the catalyst layer cross-sectional pattern 52a, 52c.

According to the above manufacturing method, the fuel cell stack body 10 including the membrane electrode assembly 12 can be simultaneously and integrally formed.

In the method for manufacturing the fuel cell stack body 10 described above, the separator cross-sectional patterns 34a and 34c and the electrolyte membrane cross-sectional pattern 40 may be formed by an inkjet method.

According to the manufacturing method described above, the finely-structured separator cross-sectional patterns 34a and 34c and electrolyte membrane cross-sectional pattern 40 can be formed with high accuracy.

The method for manufacturing the fuel cell stack body 10 may further include heating the membrane electrode assembly 12 and the separators 14a and 14c.

According to the manufacturing method described above, the fuel cell stack body 10 having excellent strength and shape stability can be manufactured.

In the method for manufacturing the fuel cell stack 100, including the method for manufacturing the fuel cell stack body 10, the fuel cell stack 100 may be formed by overlapping and stacking a plurality of the fuel cell stack bodies 10.

According to the above-described method of manufacturing the fuel cell stack 100, the fuel cell stack 100 having a large number of stacked layers can be easily manufactured.

Second Embodiment

Figure 7A:
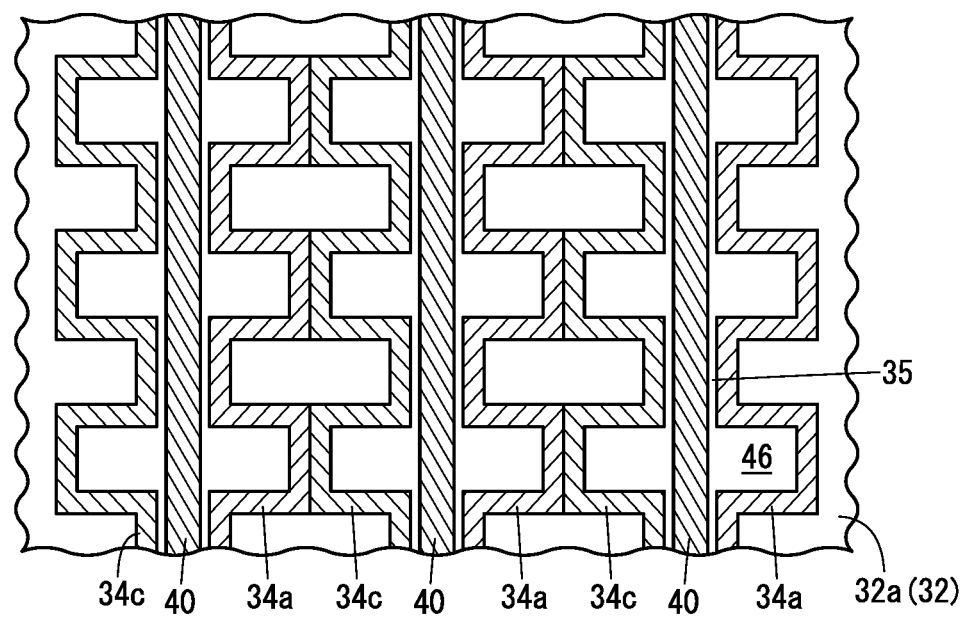
FIG. 7A is a plan view showing a state immediately after an electrolyte membrane cross-sectional pattern according to a second embodiment is formed.
Figure 7B:
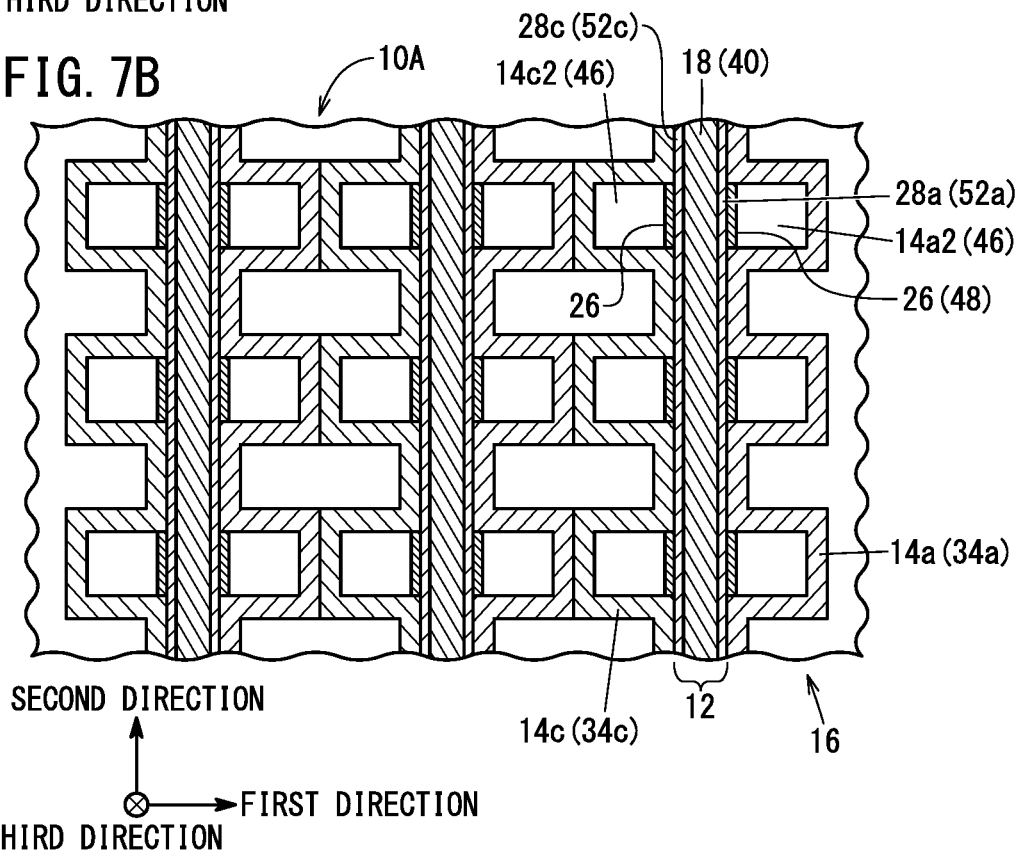
FIG. 7B is a plan view showing a method of forming an electrode cross-sectional pattern according to the second embodiment.

As shown in FIG. 7B, the fuel cell stack body 10A of the present embodiment differs from the fuel cell stack body 10 of FIG. 1, in the membrane electrode assembly 12. In the fuel cell stack body 10A of the present embodiment, the same components as those of the fuel cell stack body 10 described with reference to FIG. 1 are denoted by the same reference numerals, and detailed description thereof will be omitted.

As shown in FIG. 7B, in the fuel cell stack body 10A of the present embodiment, the entire surface of the electrolyte membrane 18 on the anode side is covered with the anode catalyst layer 28a. The entire surface of the electrolyte membrane 18 on the cathode side is covered with the cathode catalyst layer 28c. As a result, in the fuel cell stack body 10A, the areas of the catalyst layers 28a and 28c are increased, so that the power generation area is increased and power generated by the fuel cell stack body 10A can be increased. The electrolyte membrane 18 is sandwiched between the first separator 14a and the second separator 14c via the anode catalyst layer 28a and the cathode catalyst layer 28c. The anode diffusion layer 26 is provided on the separation portion 14a2 between the anode catalyst layer 28a and the first separator 14a. The diffusion layer 26 of the cathode is provided on the separation portion 14c2 between the cathode catalyst layer 28c and the second separator 14c. The diffusion layer 26 may be formed so as to cover the entire surface of the anode catalyst layer 28a and the entire surface of the cathode catalyst layer 28c. In this case, a larger amount of reactant gas can be supplied to portions of the catalyst layers 28a and 28c that are sandwiched between the first separator 14a and the second separator 14c, through the diffusion layer 26.

The fuel cell stack body 10A is basically manufactured by the manufacturing method described with reference to FIGS. 2 to 6. However, the manufacturing method of the present embodiment differs from the manufacturing method of FIGS. 2 to 6, in the step of forming the electrolyte membrane cross-sectional pattern 40 and the step of forming the catalyst layer cross-sectional patterns 52a and 52c.

In the present embodiment, as shown in FIG. 7A, in the step of forming the electrolyte membrane cross-sectional pattern 40 constituting one layer of the electrolyte membrane 18 by the inkjet method, the width (dimension in the first direction) of the electrolyte membrane cross-sectional pattern 40 is formed narrower than the gap 35 between the separator cross-sectional patterns 34a and 34c. In this step, gaps are formed between the electrolyte membrane cross-sectional pattern 40 and the separator cross-sectional pattern 34a and between the electrolyte membrane cross-sectional pattern 40 and the separator cross-sectional pattern 34c.

Next, a catalyst layer cross-sectional pattern 52a as shown in FIG. 7B is formed on the entire side surface of the electrolyte membrane cross-sectional pattern 40 on which the anode is to be formed, by an inkjet method or a spray method. The catalyst layer cross-sectional pattern 52a is formed so as to fill the gap between the electrolyte membrane cross-sectional pattern 40 and the separator cross-sectional pattern 34a.

Next, the catalyst layer cross-sectional pattern 52c is formed on the entire side surface for the cathode of the electrolyte membrane cross-sectional pattern 40 by an inkjet method or a spray method. In this step, the catalyst layer cross-sectional pattern 52c is formed so as to fill the gap between the electrolyte membrane cross-sectional pattern 40 and the separator cross-sectional pattern 34c.

Thereafter, the diffusion layer cross-sectional patterns 48 are formed on the side surfaces of the catalyst layer cross-sectional patterns 52a and 52c exposed in the separation portions 46, and the one-layer fabricated object having the cross-sectional structure of FIG. 7B is completed. Thereafter, by repeating the above-described steps, the fuel cell stack body 10A of the present embodiment is completed by stacking the cross-sectional structure of FIG. 7B in the third direction.

As described above, according to the method of manufacturing the fuel cell stack body 10A of the present embodiment, the fuel cell stack body 10A having a structure in which both side surfaces of the electrolyte membrane 18 are covered respectively with the anode catalyst layer 28a and the cathode catalyst layer 28c, and the electrolyte membrane 18 is in contact with the first separator 14a and the second separator 14c via the anode catalyst layer 28a and the diffusion layer 26 is obtained. As a result, the electrical contact portions between the anode 24a and the separator 14a and between the cathode 24c and the separator 14c are widened. Therefore, electric current generated by the electrochemical reactions at the electrodes can be efficiently extracted.

In the method of manufacturing the fuel cell stack body 10A of the present embodiment, in addition to the anode catalyst layer 28a and the cathode catalyst layer 28c, the diffusion layer 26 may be formed on the entire side surface of the electrolyte membrane 18 in FIG. 7B. According to this manufacturing method, the fuel cell stack body 10A having a structure in which the electrolyte membrane 18 is in contact with the first separator 14a and the second separator 14c via the diffusion layers 26 and the catalyst layers 28a and 28c is obtained. According to this manufacturing method, the electrical contact portion between the anode 24a and the separator 14a and the electrical contact portion between the cathode 24c and the separator 14c can be widened.

Although the present invention has been described with reference to the preferred embodiments, the present inven-

What is claimed is:

1. A method for manufacturing a fuel cell stack body including a membrane electrode assembly and separators stacked together, the membrane electrode assembly including an electrolyte membrane and electrodes provided on both surfaces of the electrolyte membrane, the method comprising:
   forming a stack body cross-sectional pattern along a build surface, the stack body cross-sectional pattern including: a plurality of line-shaped separator cross-sectional patterns made of a conductive material; a line-shaped electrolyte membrane cross-sectional pattern made of an ion conductive material; and electrode cross-sectional patterns each including a diffusion layer cross-sectional pattern and a catalyst layer cross-sectional pattern; and
   repeating the forming of the stack body cross-sectional pattern in a manner that the stack body cross-sectional pattern is stacked one on top of another in a direction perpendicular to the build surface,
   wherein the forming the stack body cross-sectional pattern includes forming the separator cross-sectional patterns adjacent to each other, and forming the electrolyte membrane cross-sectional pattern between the separator cross-sectional patterns adjacent to each other.

2. The method for manufacturing the fuel cell stack body according to claim 1,
   wherein a first direction along the build surface is a stacking direction of the membrane electrode assembly and the separators, and a second direction extends along the build surface and is orthogonal to the first direction, the second direction extending along a planar direction of the separators; and
   wherein the forming of the stack body cross-sectional pattern comprises:
   forming the plurality of line-shaped separator cross-sectional patterns extending in the second direction and meandering so as to have convexities and concavities in the first direction;
   forming the line-shaped electrolyte membrane cross-sectional pattern extending in the second direction, between the plurality of separator cross-sectional patterns; and
   forming the electrode cross-sectional patterns each including the diffusion layer cross-sectional pattern and the catalyst layer cross-sectional pattern, on respective both sides, in the first direction, of the electrolyte membrane cross-sectional pattern.

3. The method for manufacturing the fuel cell stack body according to claim 2, wherein the forming of the electrode cross-sectional patterns comprises:
   forming the catalyst layer cross-sectional pattern on a side portion of the electrolyte membrane cross-sectional pattern that is separated from the separator cross-sectional pattern; and
   forming the diffusion layer cross-sectional pattern on a side portion of the catalyst layer cross-sectional pattern.

4. The method for manufacturing the fuel cell stack body according to claim 1, further comprising heating the membrane electrode assembly and the separators.

5. A method for manufacturing a fuel cell stack, including a method for manufacturing a fuel cell stack body, the method for manufacturing the fuel cell stack, comprising:
   forming a fuel cell stack by overlapping and stacking a plurality of fuel cell stack bodies, wherein:
   each of the fuel cell stack bodies includes a membrane electrode assembly and separators stacked together, the membrane electrode assembly including an electrolyte membrane and electrodes provided on both surfaces of the electrolyte membrane; and
   the method for the fuel cell stack body, comprises:
   forming a stack body cross-sectional pattern along a build surface, the stack body cross-sectional pattern including: a plurality of line-shaped separator cross-sectional patterns made of a conductive material; a line-shaped electrolyte membrane cross-sectional pattern made of an ion conductive material; and electrode cross-sectional patterns each including a diffusion layer cross-sectional pattern and a catalyst layer cross-sectional pattern; and
   repeating the forming of the stack body cross-sectional pattern in a manner that the stack body cross-sectional pattern is stacked one on top of another in a direction perpendicular to the build surface,
   wherein the forming the stack body cross-sectional pattern includes forming the separator cross-sectional patterns adjacent to each other, and forming the electrolyte membrane cross-sectional pattern between the separator cross-sectional patterns adjacent to each other.

* * * * *